(12) United States Patent
Oiwa

(10) Patent No.: US 11,070,158 B2
(45) Date of Patent: Jul. 20, 2021

(54) ROTARY ELECTRIC MACHINE CONTROL APPARATUS

(71) Applicant: DENSO CORPORATION, Kariya (JP)

(72) Inventor: Toru Oiwa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/412,886

(22) Filed: May 15, 2019

(65) Prior Publication Data
US 2019/0356259 A1    Nov. 21, 2019

(30) Foreign Application Priority Data
May 17, 2018    (JP) .............................. JP2018-095375

(51) Int. Cl.
| H02P 25/22 | (2006.01) |
| B62D 5/04 | (2006.01) |
| H02P 25/18 | (2006.01) |
| H02P 29/028 | (2016.01) |

(52) U.S. Cl.
CPC ............ *H02P 25/22* (2013.01); *B62D 5/0412* (2013.01); *H02P 25/18* (2013.01); *H02P 29/028* (2013.01); *H02P 2207/07* (2013.01)

(58) Field of Classification Search
CPC .... H02P 25/22; H02P 29/028; H02P 2207/07; H02P 25/18; B62D 5/0481; B62D 5/0412
See application file for complete search history.

(56) References Cited

U.S. PATENT DOCUMENTS

| 8,791,662 | B2* | 7/2014 | Tanaka | B60L 9/28 |
| | | | | 318/494 |
| 2014/0292286 | A1* | 10/2014 | Tabata | B60L 15/20 |
| | | | | 322/91 |
| 2016/0094175 | A1 | 3/2016 | Yamasaki | |
| 2016/0181953 | A1* | 6/2016 | Oyama | G05B 15/02 |
| | | | | 180/446 |
| 2016/0241182 | A1 | 8/2016 | Kuramitsu | |
| 2017/0166248 | A1* | 6/2017 | Asao | B62D 5/0493 |
| 2018/0037253 | A1 | 2/2018 | Kano et al. | |

FOREIGN PATENT DOCUMENTS

| JP | 2016073098 A | 5/2016 |
| JP | 2016152682 A | 8/2016 |
| JP | 2018026891 A | 2/2018 |
| JP | 2018078765 A | 5/2018 |
| JP | 2018130007 A | 8/2018 |

* cited by examiner

*Primary Examiner* — Bickey Dhakal
(74) *Attorney, Agent, or Firm* — Maschoff Brennan

(57) ABSTRACT

A rotary electric machine control apparatus is provided which controls energization of a rotary electric machine having a plurality of winding sets. The apparatus includes an energization control circuit that is provided for each of the winding sets and has a switching element related to switching of energization to the winding set, a driver circuit that outputs a drive signal to the switching element through a signal line connected to the switching element, and a protection element that is connected to the signal line and in parallel with the switching element. When combinations of the winding sets and electronic components including the energization control circuit provided for each of the winding sets are regarded as systems, in at least one of the systems, performance of the protection element is differentiated from that in the other system to make noise resistance different from noise resistance in the other system.

7 Claims, 11 Drawing Sheets

11,070,158 B2

ROTARY ELECTRIC MACHINE CONTROL APPARATUS

CROSS-REFERENCE TO RELATED APPLICATION

This application is based on and claims the benefit of priority from earlier Japanese Patent Application No. 2018-95375 filed May 17, 2018, the description of which is incorporated herein by reference.

BACKGROUND

Technical Field

The present disclosure relates to a rotary electric machine control apparatus.

Related Art

There have been conventionally known rotary electric machine control apparatuses that control energization of a rotary electric machine.

SUMMARY

As an aspect of the present disclosure, a rotary electric machine control apparatus is provided which controls energization of a rotary electric machine having a plurality of winding sets. The apparatus includes: an energization control circuit that is provided for each of the winding sets and has a switching element related to switching of energization to the winding set; a driver circuit that outputs a drive signal to the switching element through a signal line connected to the switching element; and a protection element that is connected to the signal line and in parallel with the switching element. When combinations of the winding sets and electronic components including the energization control circuit provided for each of the winding sets are regarded as systems, in at least one of the systems, performance 3o of the protection element is differentiated from that in the other system to make noise resistance different from noise resistance in the other system.

DETAILED DESCRIPTION OF THE PREFERRED EMBODIMENTS

There have been conventionally known rotary electric machine control apparatuses that control energization of a rotary electric machine. For example, JP 2016-73098 A describes a rotary electric machine control apparatus in which a configuration for heat radiation from a switching element to a heat sink is differentiated between a specific circuit and a normal circuit to decrease the probability of simultaneous failure of power conversion circuits in a plurality of systems.

It is assumed that electronic components such as switching elements constituting an inverter circuit may fail due to electrical noise. JP 2016-73098 A describes a failure due to heat but does not describe occurrence of a failure due to electrical noise. The present disclosure is made in light of the foregoing problem, and an object of the present disclosure is to provide a rotary electric machine control apparatus that can decrease the probability of simultaneous failure of a plurality of systems.

Hereinafter, a rotary electric machine control apparatus according to the present disclosure will be described with reference to the drawings. In the following description, substantially identical components in a plurality of embodiments will be given identical reference signs and descriptions thereof will be omitted.

First Embodiment

Figure 1:
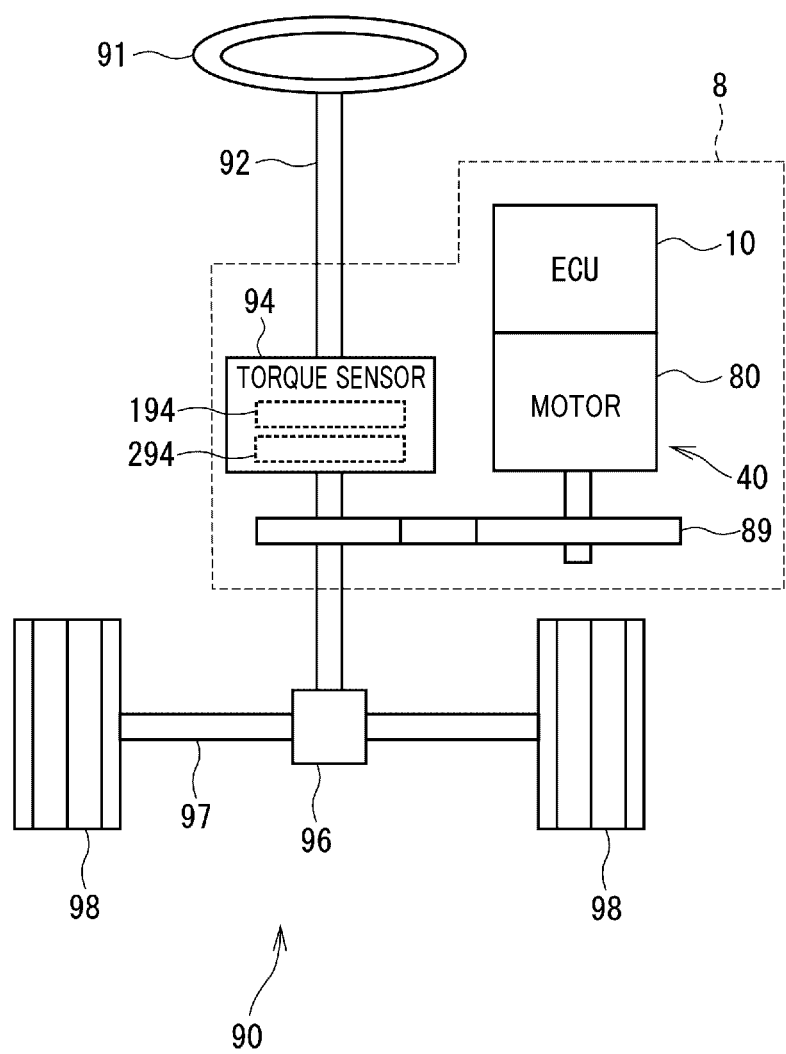
FIG. 1 is a schematic configuration diagram of a steering system according to a first embodiment.

As illustrated in FIG. 1, an ECU (electronic control unit) 10 as a rotary electric machine control apparatus according to the first embodiment is applied to an electrical power steering apparatus 8 together with a motor 80 as a rotary electric machine. FIG. 1 illustrates an overall configuration of a steering system 90 including the electrical power steering apparatus 8. The steering system 90 includes, as steering members, a steering wheel 91, a steering shaft 92, a pinion gear 96, a rack shaft 97, wheels 98, and an electrical power steering apparatus 8, and the like.

The steering wheel 91 is connected to the steering shaft 92. The steering shaft 92 is provided with a torque sensor 94 to detect steering torque. The torque sensor 94 has a first sensor part 194 and a second sensor part 294. The pinion gear 96 is provided at a tip of the steering shaft 92. The pinion gear 96 engages with the rack shaft 97. The pair of wheels 98 is coupled to the ends of the rack shaft 97 via tie rods and the like.

When the driver rotates the steering wheel 91, the steering shaft 92 connected to the steering wheel 91 rotates. Rotating motion of the steering shaft 92 is converted by the pinion gear 96 to linear motion of the rack shaft 97. The pair of wheels 98 is steered at an angle corresponding to the amount of displacement of the rack shaft 97.

The electrical power steering apparatus 8 includes a driving device 40 having the motor 80 and the ECU 10 and a deceleration gear 89 as a power transmission part that decelerates the rotation of the motor 80 and transmits the rotation to the steering shaft 92. The electrical power steering apparatus 8 according to the present embodiment is a so-called "column assist type" but may be a so-called "rack assist type" that transmits the rotation of the motor 80 to the rack shaft 97. In the present embodiment, the steering shaft 92 corresponds to a "drive target".

Figure 2:
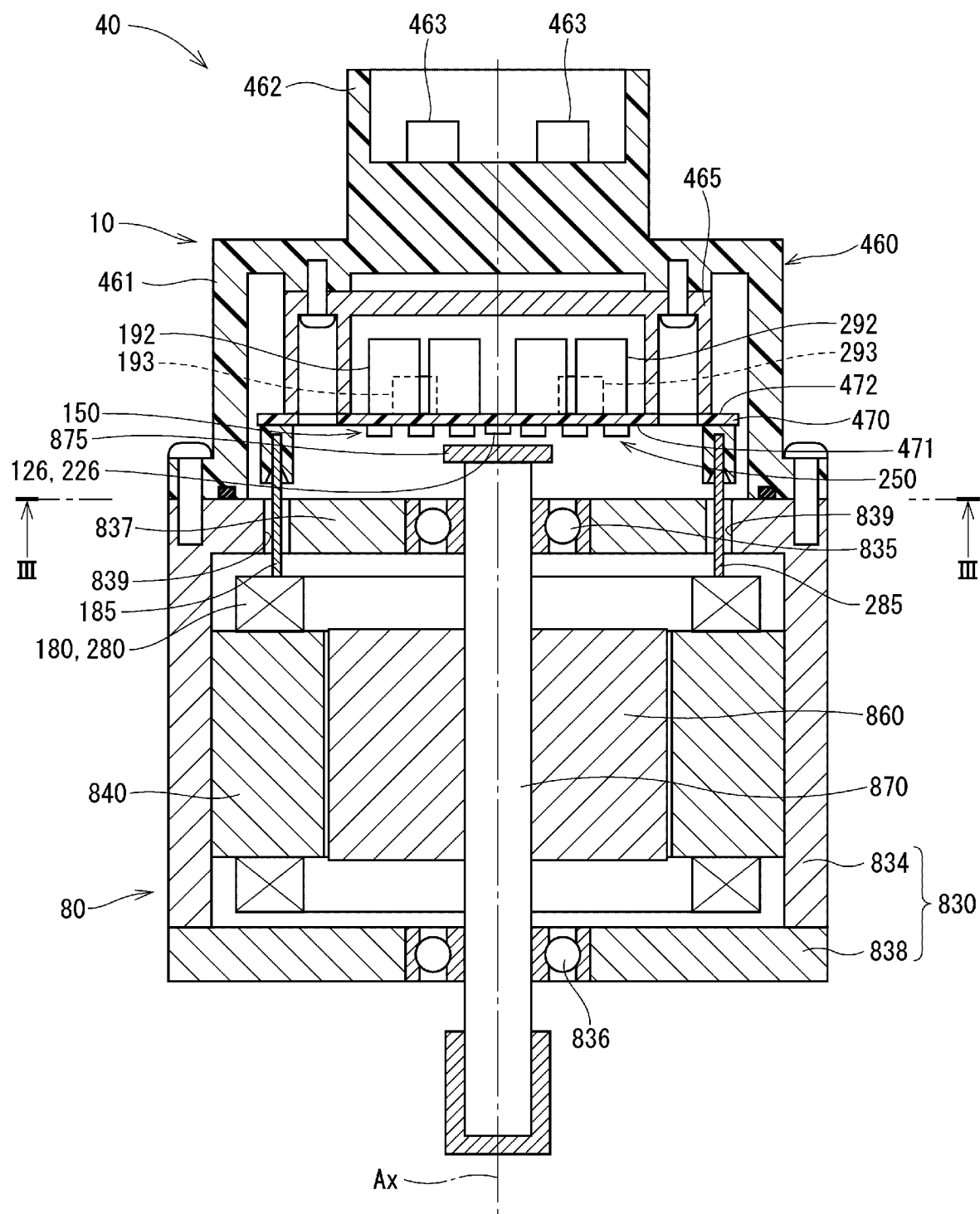
FIG. 2 is a cross-sectional view of a driving system according to the first embodiment.
Figure 3:
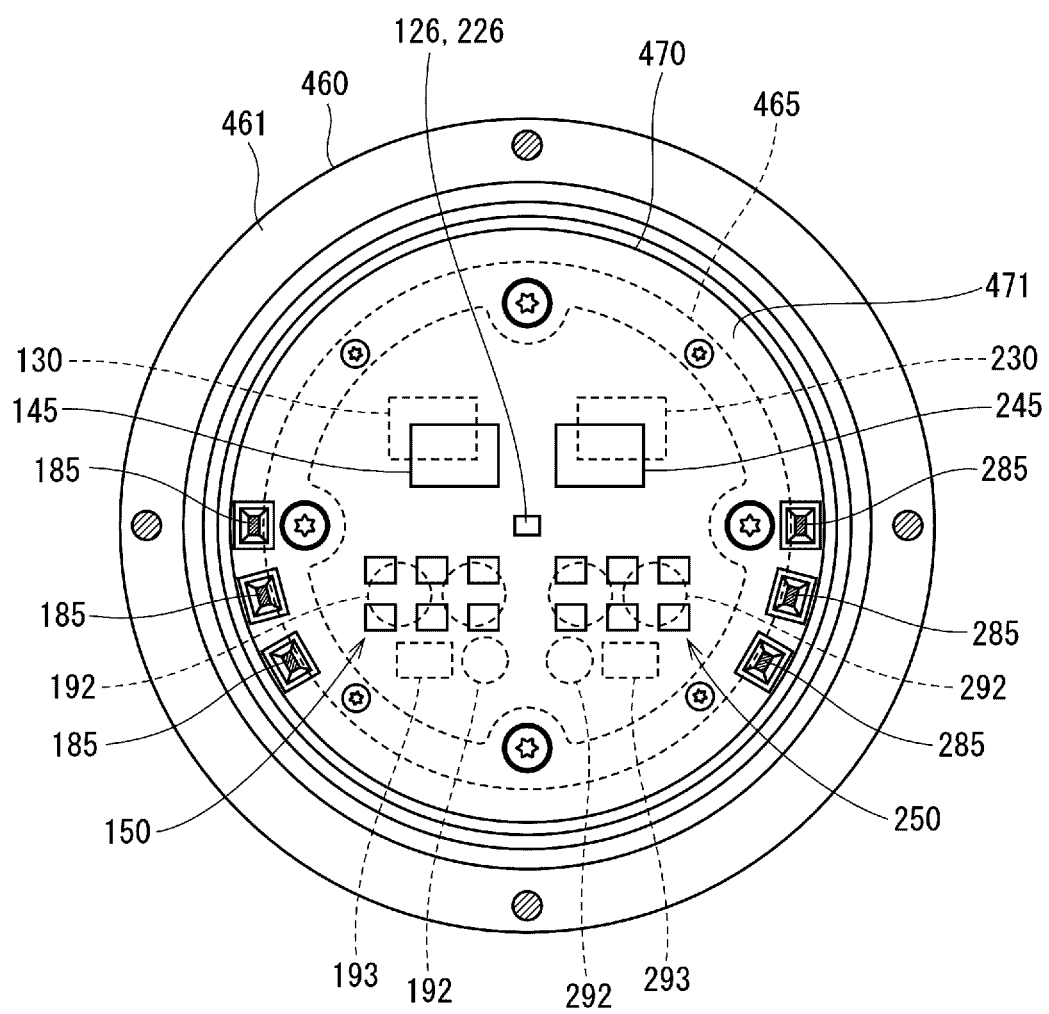
FIG. 3 is a cross-sectional view of FIG. 2 taken along line III-III.

As illustrated in FIGS. 2 and 3, the motor 80 outputs part or all of torque necessary for steering. The motor 80 is driven by power supply from batteries 191 and 291 as power sources to rotate the deceleration gear 89 in forward and reverse directions. The motor 80 is a three-phase brushless motor and has a rotor 860 and a stator 840.

Figure 4:
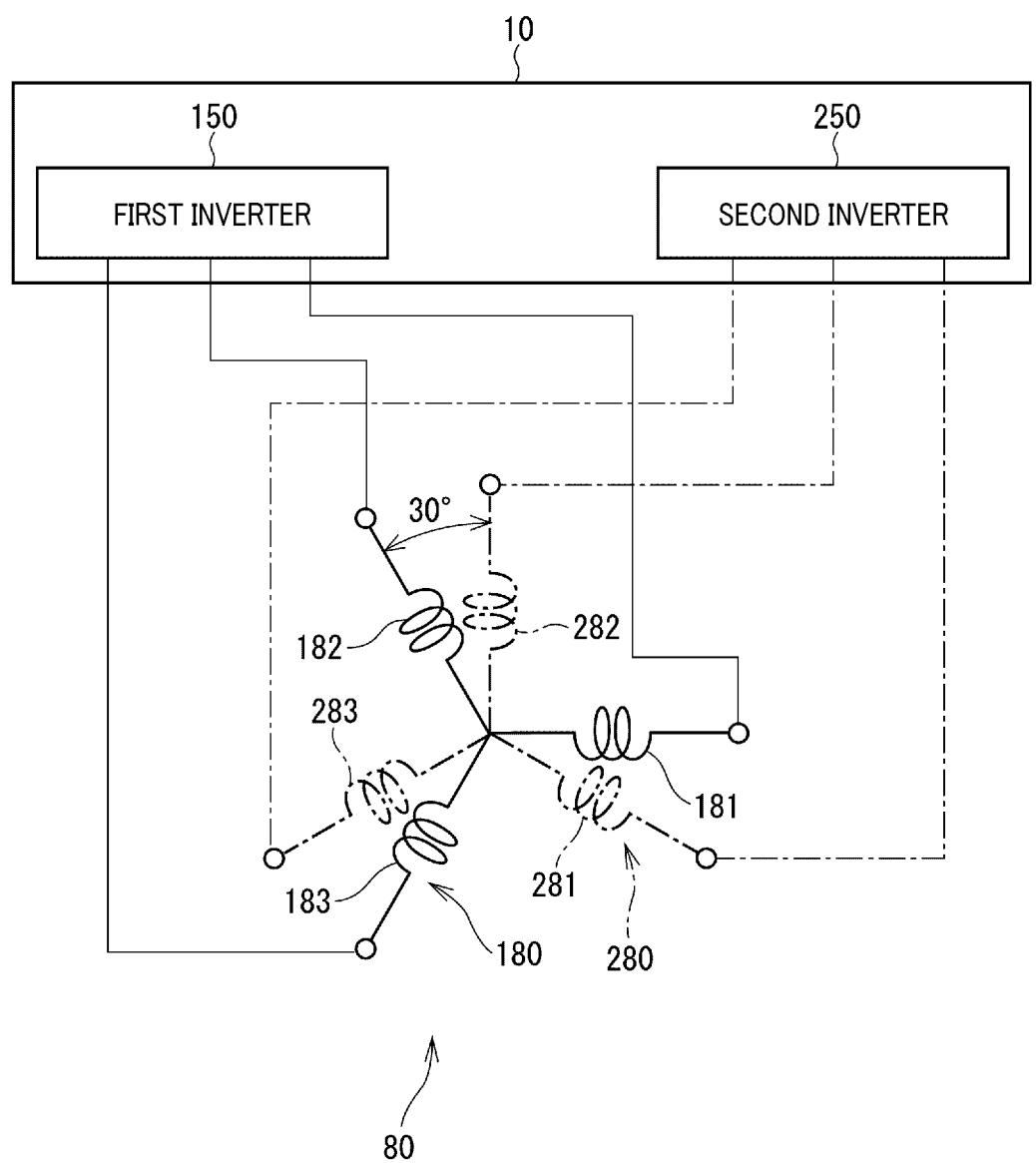
FIG. 4 is a diagram for describing motor windings according to the first embodiment.

As illustrated in FIG. 4, the motor 80 has a first motor winding 180 and a second motor winding 280 as a winding set. In FIG. 4, for differentiation between the motor windings 180 and 280, the first motor winding 180 is shown by a solid line and the second motor winding 280 is shown by a one-dot chain line. This is also applied to FIG. 12 referred to later. The first motor winding 180 has a U-phase coil 181, a V-phase coil 182, and a W-phase coil 183. The second motor winding 280 has a U-phase coil 281, a V-phase coil 282, and a W-phase coil 283. A connection part of the first motor winding 180 and a connection part of the second motor winding 280 are electrically insulated from each other. The motor windings 180 and 280 are equal in electrical characteristics and are cancel-wound on a common stator 840 with a shift from each other by an electrical angle of 30°. Accordingly, phase currents shifted in phase ϕ by 30° are distributed to the motor windings 180 and 280. Optimizing the energization phase difference improves output torque and reduces a sixth torque ripple. In addition, the phase-difference energization averages the electric current to maximize the merit of cancelling noise and vibration. Further, the phase-difference energization averages heat generation to reduce temperature-depending inter-system errors in detection values and torque from the sensors and average the amount of electric current capable of being distributed.

Hereinafter, a combination of the first motor winding 180 and electric components such as a first control unit 130 and a first inverter circuit 150 relating to energization control of the first motor winding 180 will be referred to as a first system L1, and a combination of the second motor winding 280 and electronic components such as a second control unit 230 and a second inverter circuit 250 relating to energization control of the second motor winding 280 will be referred to as a second system L2. The components of the first system L1 will be mainly given reference numerals in the 100s, and the components of the second system L2 will be mainly given reference numerals in the 200s. In the first system L1 and the second system L2, similar components are numbered such that the last two digits of the reference numerals are the same. Hereinafter, the "first" will be represented by the prefix "1", and the "second" will be described by the prefix "2" as appropriate.

As illustrated in FIG. 2, the driving device 40 is an electro-mechanical type in which the ECU 10 is integrally provided on one axial side of the motor 80. Alternatively, the motor 80 and the ECU 10 may be separately provided. The ECU 10 is arranged coaxially to an axial line Ax of a shaft 870 on the side opposite to an output shaft of the motor 80. The ECU 10 may be provided on the output shaft side of the motor 80. Forming the driving device 40 in an electro-mechanical type allows efficient arrangement of the ECU 10 and the motor 80 in a vehicle with a limited mounting space.

The motor 80 includes a stator 840, a rotor 860, a housing 830 storing these parts, and the like. The stator 840 is fixed to the housing 830, and the motor windings 180 and 280 are wound on the stator 840. The rotor 860 is provided radially inside the stator 840 in a manner capable of relative rotation with respect to the stator 840.

The shaft 870 is fitted into the rotor 860 and rotates integrally with the rotor 860. The shaft 870 is rotatably supported by bearings 835 and 836 in the housing 830. An end of the shaft 870 on the ECU 10 side protrudes from the housing 830 to the ECU 10 side. A magnet 875 is provided at the end of the shaft 870 on the ECU 10 side.

The housing 830 has a cylindrical bottomed case 834 including a rear frame end 837 and a front frame end 838 provided on the opening side in the case 834. The case 834 and the front frame end 838 are tightened together by bolts or the like. The rear frame end 837 has lead line insertion holes 839. Lead lines 185 and 285 are inserted into the lead line insertion holes 839 and are connected to the respective phases of the motor windings 180 and 280. The lead lines 185 and 285 are taken out from the lead line insertion holes 839 to the ECU 10 side and are connected to the substrate 470.

The ECU 10 includes a cover 460, a heat sink 465 fixed to the cover 460, the substrate 470 fixed to the heat sink 465, and various electronic components mounted on the substrate 470.

The cover 460 protects the electronic components from external shock and prevents intrusion of dust and water into the ECU 10. In the cover 460, a cover body 461 and a connector part 462 are integrally formed. The connector part 462 may be formed separately from the cover body 461. Terminals 463 of the connector part 462 are connected to the substrate 470 through lines or the like not illustrated. The number of connectors and the number of terminals can be changed as appropriate according to the number of signals. The connector part 462 is provided at an axial end of the driving device 40 and is opened to the side opposite to the motor 80. The connector part 462 includes various connectors described later.

The substrate 470 is a printed circuit board, for example, and is opposed to the rear frame end 837. The substrate 470 has electronic components in two systems mounted thereon independently from each other's system to form a fully redundant configuration. In the present embodiment, the electronic components are mounted on the one substrate 470, but the electronic components may be mounted on a plurality of substrates.

Figure 7:
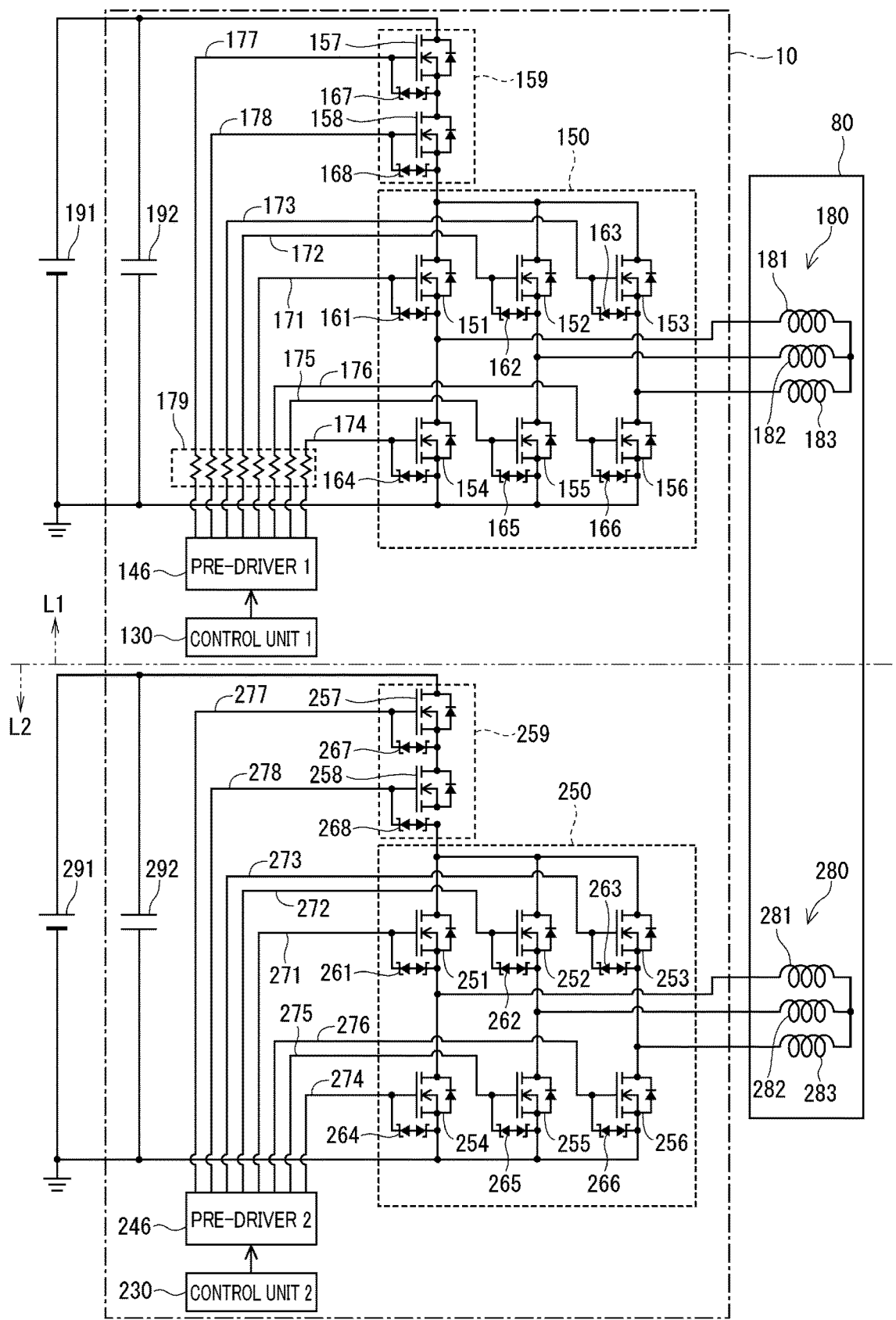
FIG. 7 is a circuit diagram illustrating energization control circuits according to the first embodiment.
Figure 8:
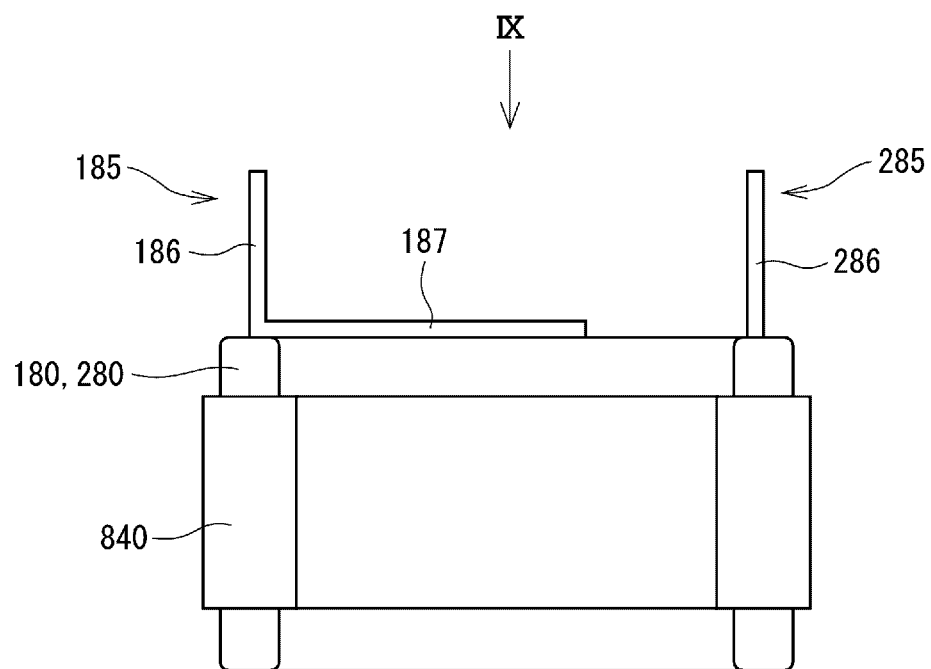
FIG. 8 is a side view of lead lines according to a second embodiment.
Figure 9:
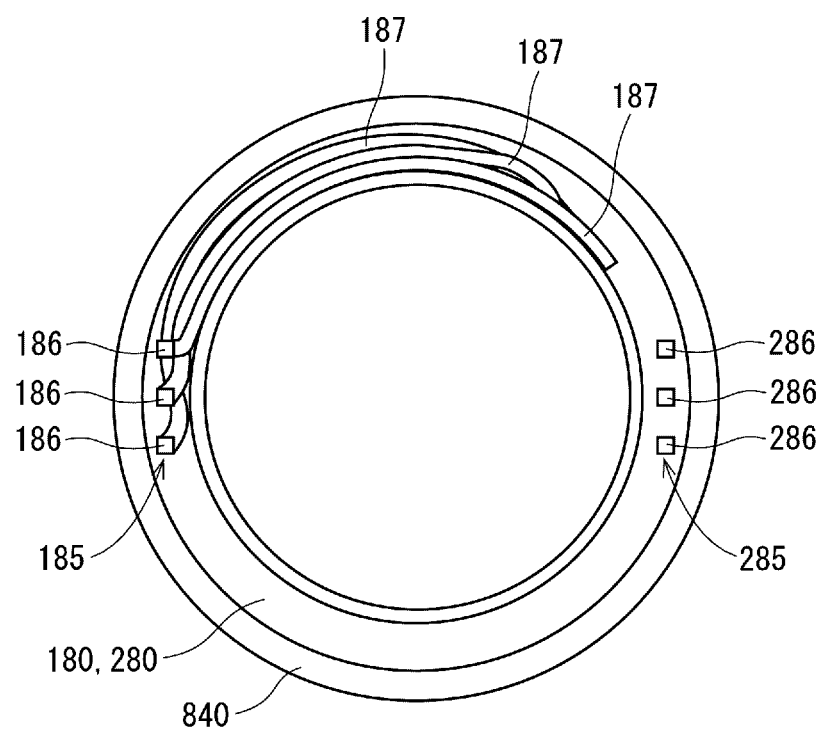
FIG. 9 is a view as seen in the direction of an arrow IX of FIG. 8.

Out of two main surfaces of the substrate 470, the surface on the motor 80 side will be designated as a motor surface 471, and the surface opposite to the motor 80 as a cover surface 472. As illustrated in FIGS. 3 and 7, mounted on the motor surface 471 are switching elements 151 to 156 constituting a first inverter circuit 150, switching elements 251 to 256 constituting a second inverter circuit 250, rotation angle sensors 126 and 226, and custom ICs 145 and 245, and the like. The custom ICs 145 and 245 include pre-drivers 146 and 246, respectively. The rotation angle sensors 126 and 226 are mounted at positions opposed to the magnet 875 to detect changes in a magnetic field resulting from the rotation of the magnet 875.

Mounted on the cover surface 472 are capacitors 192 and 292, inductors 193 and 293, and microcomputers constituting control units 130 and 230. In FIG. 3, the microcomputers constituting the control units 130 and 230 are given respective reference numerals 130 and 230. The capacitors 192 and 292 smooth out electric power input from the batteries 191 and 291. The capacitors 192 and 292 accumulate electric charge to assist power supply to the motor 80. The capacitors 192 and 292 and the inductors 193 and 293 constitute filter circuits to reduce noise transmitted from other devices sharing the batteries 191 and 291 and reduce noise transmitted from the driving device 40 to other devices sharing the batteries 191 and 291. Although not illustrated in FIG. 3, switching elements 157, 158, 257, and 258, a motor relay, current sensors 125 and 225, and the like constituting power source circuits 159 and 259 are mounted on the motor surface 471 or the cover surface 472. FIG. 7 does not illustrate the inductors 193 and 293, the motor relays, and the like.

Figure 5:
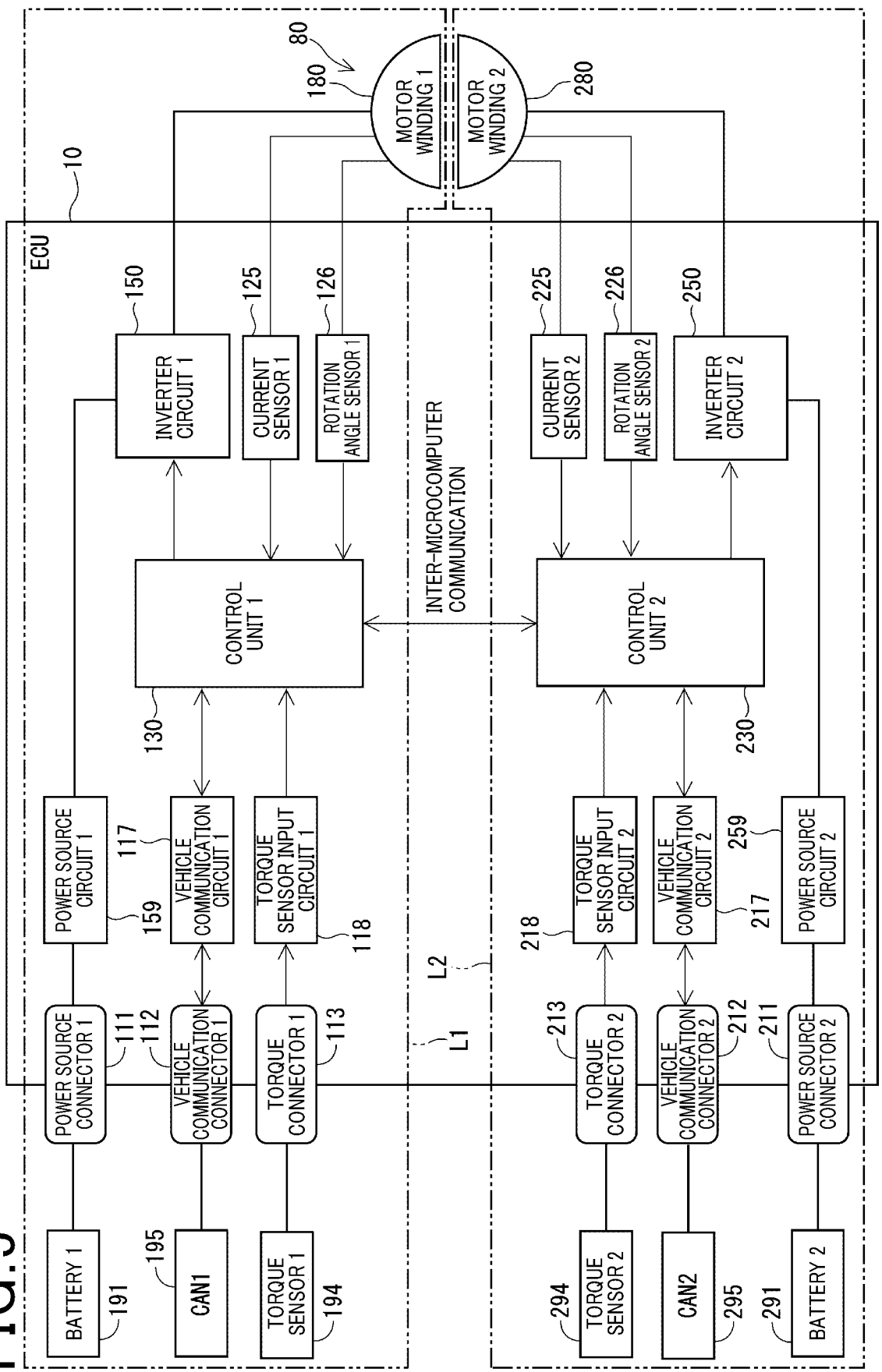
FIG. 5 is a block diagram illustrating an ECU according to the first embodiment.

As illustrated in FIG. 5, the ECU 10 includes the control units 130 and 230, the inverter circuits 150 and 250, and the power source circuits 159 and 259, and the like. The ECU 10 includes a first power source connector 111, a first vehicle communication connector 112, a first torque connector 113, a second power source connector 211, a second vehicle communication connector 212, and a second torque connector 213.

The first power source connector 111 is connected to the first battery 191, and the second power source connector 211 is connected to the second battery 291. The connectors 111 and 211 may be connected to the same battery. The first power source connector 111 is connected to the first inverter circuit 150 through the first power source circuit 159. The second power source connector 211 is connected to the second inverter circuit 250 through the second power source circuit 259.

The first vehicle communication connector 112 is connected to a first vehicle communication network 195, and the second vehicle communication connector 212 is connected to a second vehicle communication network 295. FIG. 5 illustrates controller area networks (CANs) as examples of the vehicle communication networks 195 and 295. The vehicle communication networks 195 and 295 may be in conformity with any standard such as CAN with flexible data rate (CAN-FD) or FlexRay.

The first vehicle communication connector 112 is connected to the first control unit 130 through the first vehicle communication circuit 117. The first control unit 130 can exchange information with the vehicle communication network 195 through the vehicle communication connector 112 and the vehicle communication circuit 117. The second vehicle communication connector 212 is connected to the second control unit 230 through the second vehicle communication circuit 217. The second control unit 230 can exchange information with the vehicle communication network 295 through the vehicle communication connector 212 and the vehicle communication circuit 217.

The torque connectors 113 and 213 are connected to the torque sensor 94. Specifically, the first torque connector 113 is connected to the first sensor part 194 of the torque sensor 94. The second torque connector 213 is connected to the second sensor part 294 of the torque sensor 94. FIG. 5 illustrates the first sensor part 194 as "torque sensor 1" and the second sensor part 294 as "torque sensor 2".

The first current sensor 125 detects a U-phase current Iu1, a V-phase current Iv1, and a W-phase current Iw1 that are distributed to the respective phases of the first motor winding 180, and outputs the detection values to the first control unit 130. The second current sensor 225 detects a U-phase current Iu2, a V-phase current Iv2, and a W-phase current Iw2 that are distributed to the respective phases of the second motor winding 280, and outputs the detection values to the second control unit 230. Hereinafter, the U-phase current, the V-phase current, and the W-phase current will be collectively referred to as "phase currents" or "three-phase currents" as appropriate. In addition, a d-axis current and a q-axis current will be collectively referred to as "dq-axis currents" as appropriate. The same applies to the voltages.

The first rotation angle sensor 126 detects a rotation angle of the motor 80 and outputs the same to the first control unit 130. The second rotation angle sensor 226 detects a rotation angle of the motor 80 and outputs the same to the second control unit 230. In the present embodiment, an electrical angle based on the detection value of the first rotation angle sensor 126 is designated as first electrical angle EleAng1 and an electrical angle based on the detection value from the second rotation angle sensor 226 is designated as second electrical angle EleAng2.

The first control unit 130 is supplied with electric power from the first battery 191 through the first power source connector 111 and a regulator not illustrated. The second control unit 230 is supplied with electric power from the second battery 291 through the second power source connector 211 and a regulator not illustrated. The first control unit 130 can acquire a torque signal related to steering torque Ts from the first sensor part 194 of the torque sensor 94 through the torque connector 113 and a torque sensor input circuit 118. The second control unit 230 can acquire a torque signal related to steering torque Ts from the second sensor part 294 of the torque sensor 94 through the torque connector 213 and a torque sensor input circuit 218. Accordingly, the control units 130 and 230 can calculate the steering torque Ts based on the torque signals.

Figure 6:
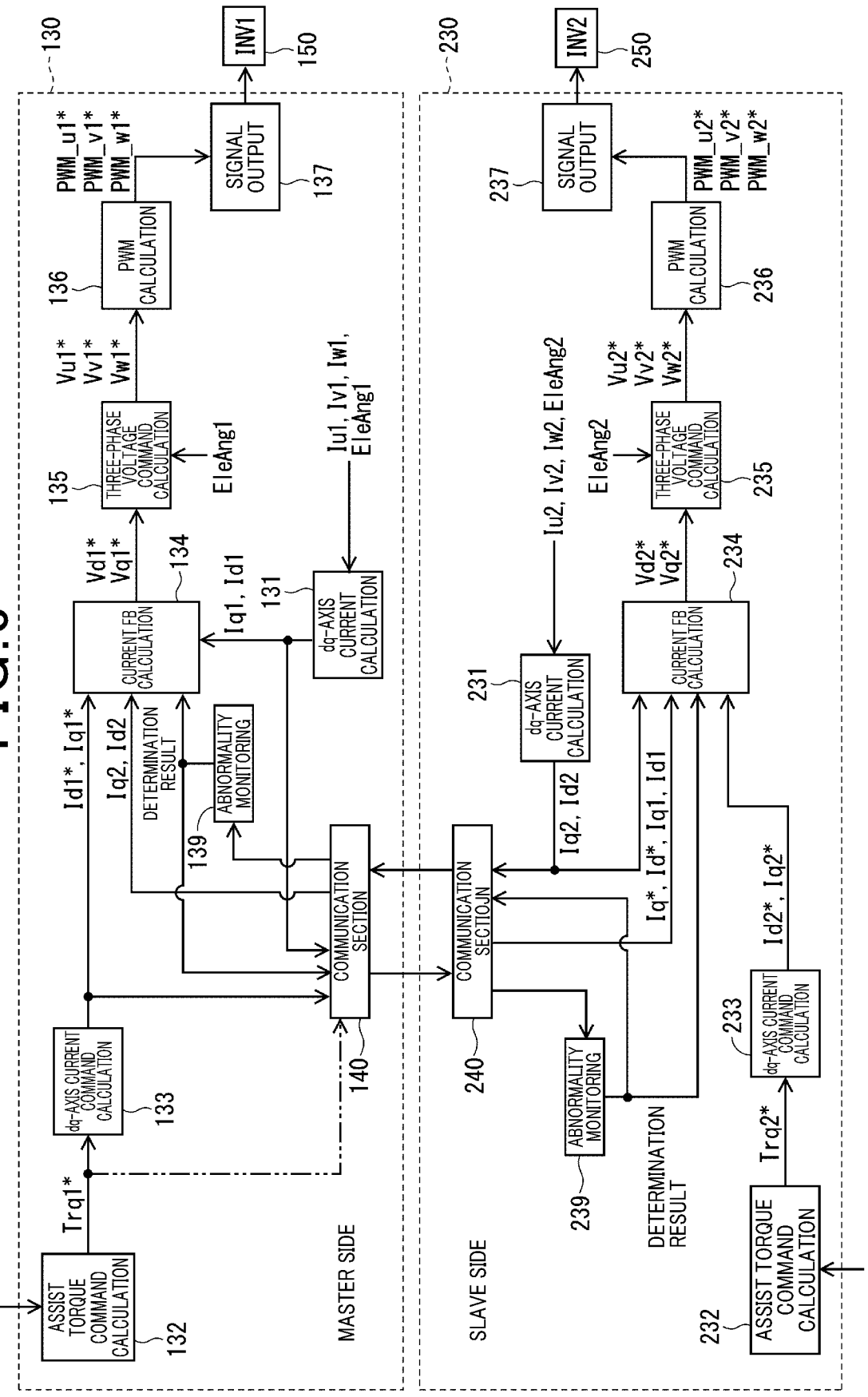
FIG. 6 is a block diagram illustrating control units according to the first embodiment.

FIG. 6 illustrates details of the control units 130 and 230. Each of the control units 130 and 230 is configured mainly of a microcomputer and includes therein a CPU, a ROM, a RAM, an I/O, and a bus line connecting these components, all of which are not illustrated in the drawing. The processes performed by the control units 130 and 230 may be software processes implemented by the CPU executing a program stored in advance in a tangible memory device such as a ROM (that is, a readable non-transitory tangible recording medium) or hardware processes performed by a dedicated electronic circuit.

The first control unit 130 as a master control unit has a dq-axis current calculation section 131, an assist torque command calculation section 132, a dq-axis current command calculation section 133, a current feedback calculation section 134, a three-phase voltage command calculation section 135, a PWM calculation section 136, a signal output section 137, an abnormality monitoring section 139, a communication section 140, and the like. In the drawing, feedback is referred to as "FB".

The dq-axis current calculation section 131 subjects the phase currents Iu1, Iv1, and Iw1 acquired from the first current sensor 125 to dq-axis conversion using the electrical angle EleAng1 to calculate dq-axis current detection values Id1 and Iq1.

The assist torque command calculation section 132 calculates a torque command value Trq1* based on the torque signal related to the steering torque Ts and the vehicle speed. The torque command value Trq1* is output to the dq-axis current command calculation section 133. The torque command value Trq1* is also provided to a device other than the electrical power steering apparatus 8 through the vehicle communication circuit 117.

The dq-axis current command calculation section 133 calculates dq-axis current command values Id1* and Iq1* based on the torque command value Trq1*. The calculated dq-axis current command values Id1* and Iq1* are transmitted to the second control unit 230.

The current feedback calculation section 134 performs current feedback calculation based on the dq-axis current command values Id1* and Iq1* and the dq-axis current detection values Id1, Iq1, Id2, and Iq2 to calculate dq-axis voltage command values Vd1* and Vq1*. In the present embodiment, the dq-axis voltage command values Vd1* and Vq1* are calculated by "control of sum and difference" in which the sum of currents of two systems and the difference in currents between the two systems are controlled. Performing the control of sum and difference makes it possible to cancel out the influence of mutual inductances. When the information on the second control unit 230 cannot be used due to an abnormality in the second control unit 230 or a communication error, the current feedback calculation section 134 does not perform the control of sum and difference but switches to an independent control using the dq-axis current command values Id1* and Iq1* and the dq-axis current detection values Id1 and Iq1 of the first system L1.

The three-phase voltage command calculation section 135 subjects the dq-axis voltage command values Vd1* and Vq1* to inverse dq conversion using the electrical angle EleAng1 to calculate three-phase voltage command values Vu1*, Vv1*, and Vw1*. The PWM calculation unit 136 calculates PWM signals PWM_u1*, PWM_v1*, and PWM_w1* based on the three-phase voltage command values Vu1*, Vv1*, and Vw1*. The signal output section 137 outputs the PWM signals PWM_u1*, PWM_v1*, and PWM_w1* as control signals to the first inverter circuit 150 through the first pre-driver 146. FIGS. 5 and 6 do not illustrate the pre-drivers 146 and 246.

The second control unit 230 as a slave control unit has a dq-axis current calculation section 231, an assist torque command calculation section 232, a dq-axis current command calculation section 233, a current feedback calculation section 234, a three-phase voltage command calculation section 235, a PWM calculation section 236, a signal output section 237, an abnormality monitoring section 239, a communication section 240, and the like.

The dq-axis current calculation section 231 subjects the phase currents Iu2, Iv2, and Iw2 acquired from the current sensor 225 to dq-axis conversion using the electrical angle EleAng2 to calculate dq-axis current detection values Id2 and Iq2.

The assist torque command calculation section 232 calculates a torque command value Trq2* based on the torque signal related to the steering torque Ts and the vehicle speed. The dq-axis current command calculation section 233 calculates dq-axis current command values Id2* and Iq2* based on the torque command value Trq2*.

The current feedback calculation section 234 performs current feedback calculation based on the dq-axis current command values Id1* and Iq1* and the dq-axis current detection values Id1, Iq1, Id2, and Iq2 to calculate dq-axis voltage command values Vd1* and Vq1*. In the present embodiment, the dq-axis voltage command values Vd2* and Vq2* are calculated by "control of sum and difference" in which the sum of currents of two systems and the difference in currents between the two systems are controlled.

In the present embodiment, the second control unit 230 is a slave control unit and thus during normal operation, the second control unit 230 performs the current feedback control using the dq-axis current command values Id1* and Iq1* acquired from the first control unit 130, not using the dq-axis current command values Id2* and Iq2* calculated by itself. When the information on the first control unit 130 cannot be used due to an abnormality in the first control unit 130 or a communication error, the second control unit 230 does not perform the control of sum and difference but switches to an independent control using the dq-axis current command values Id2* and Iq2* and the dq-axis current detection values Id2 and Iq2 of the second system L2.

The three-phase voltage command calculation section 235 subjects the dq-axis voltage command values Vd2* and Vq2* to inverse dq conversion using the electrical angle EleAng2 to calculate three-phase voltage command values Vu2*, Vv2*, and Vw2*. The PWM calculation section 236 calculates PWM signals PWM_u2*, PWM_v2*, and PWM_w2* based on the three-phase voltage command values Vu2*, Vv2*, and Vw2*. The signal output section 237 outputs the PWM signals PWM_u2*, PWM_v2*, and PWM_w2* as control signals to the inverter circuit 250 through the pre-driver 246.

Each of the abnormality monitoring sections 139 and 239 monitors for abnormality in its own system and communication error between the control units 130 and 230. Hereinafter, the communications between the control units 130 and 230 will be referred to as "inter-microcomputer communication" as appropriate. Abnormality information related to its own system is transmitted to the control unit in the other system through inter-microcomputer communication. In addition, abnormality information relating to the other system is acquired through inter-microcomputer communications. Accordingly, the information relating to the abnormal states can be shared. The current feedback calculation units 134 and 234 perform a control according to the results of determination by the abnormality monitoring units 139 and 239. In the event of an abnormality in one system, the driving of the motor 80 can be continued by the independent control in the other system. In addition, the control unit in the normal system provides information on an abnormality in the electrical power steering apparatus 8 to the other ECU and provides the information on the abnormality to the user. For example, an abnormality in the electrical power steering apparatus 8 is notified to the user by turning on a warning lamp on an instrument panel. The method for notification to the user is not limited to turning on the warning lamp but may be any of other methods such as sound notification. This can prompt the user to repair the abnormal part.

The control units 130 and 230 have the communication sections 140 and 240 so that the control units 130 and 230 can communicate with each other. The method for communication between the control units 130 and 230 may be any of methods including serial communications such as SPI and SENT, CAN communication, and FlexRay communication.

The first communication section 140 transmits the dq-axis current detection values Id1 and Id2, the dq-axis current command values Id1* and Iq1*, and abnormality information related to the first system L1 to the second control unit 230, and receives information transmitted from the second control unit 230. Instead of the dq-axis current command values Id1* and Iq1*, the first communication unit 140 may transmit the torque command value Trq1* to the second control unit 230 as shown by a two-dot chain line in FIG. 6. The second communication section 240 transmits the dq-axis current detection values Id2 and Iq2 and abnormality information related to the second system L2 to the first control unit 130, and receives information transmitted from the first control unit 130.

As illustrated in FIG. 7, the first inverter circuit 150 has the six switching elements 151 to 156 that are bridge-connected. The switching elements 151 to 153 are connected to the high-potential side and the switching elements 154 to 156 are connected to the low-potential side. One end of the U-phase coil 181 is connected to a connection point of the U-phase switching elements 151 and 154, one end of the V-phase coil 182 is connected to a connection point of the V-phase switching elements 152 and 155, and one end of the W-phase coil 183 is connected to a connection point of the W-phase switching elements 153 and 156. The other ends of the coils 181 to 183 are connected together.

The first power source circuit 159 is provided between the first inverter circuit 150 and the positive electrode of the battery 191. The first power source circuit 159 has the switching elements 157 and 158. In the present embodiment, the switching elements 151 to 158 are MOSFETs but may be other elements such as IGBTs or thyristors. The switching elements 157 and 158 are connected in series such that parasitic diodes are oriented in opposite directions. This makes it possible to prevent flow of reverse current when the battery 191 is reversely connected by a mistake, thereby to protect the inverter circuit 150.

Gate signals from the pre-driver 146 are input into the gates of the switching elements 151 to 158 through the gate lines 171 to 178. The gate signals are signals according to control signals from the control unit 130. Accordingly, on/off operations of the switching elements 151 to 158 are controlled by commands from the control unit 130. Each of the gate lines 171 to 178 is provided with a resistor 179.

The second inverter circuit 250 has the six switching elements 251 to 256 that are bridge-connected. The switching elements 251 to 253 are connected to the high-potential side and the switching elements 254 to 256 are connected to the low-potential side. One end of the U-phase coil 281 is connected to a connection point of the U-phase switching elements 251 and 254, one end of the V-phase coil 282 is connected to a connection point of the V-phase switching elements 252 and 255, and one end of the W-phase coil 283 is connected to a connection point of the W-phase switching elements 253 and 256. The other ends of the coils 281 to 283 are connected together.

Gate signals from the pre-driver 246 are input into gates of the switching elements 251 to 258 through the gate lines 271 to 278. The gate signals are signals according to control signals from the control unit 230. Accordingly, on/off operations of the switching elements 251 to 258 are controlled by commands from the control unit 230.

The second power source circuit 259 is provided between the second inverter circuit 250 and the positive electrode of the battery 291. The second power source circuit 259 has the switching elements 257 and 258. In the present embodiment, the switching elements 251 to 258 are MOSFETs but may be other elements such as IGBTs or thyristors. The switching elements 257 and 258 are connected in series such that parasitic diodes are oriented in opposite directions. This makes it possible to prevent flow of reverse current when the battery 291 is reversely connected by a mistake, thereby to protect the second inverter circuit 250.

Protection elements 161 to 168 and 261 to 268 are respectively connected to the gate lines 171 to 178 and 271 to 278 and in parallel with the switching elements 151 to 158 and 251 to 258. Specifically, the protection element 161 is provided at a portion where the gate line 171 and the low-potential side of the switching element 151 are connected so that the protection element 161 is connected in parallel with the switching element 151. Similarly, the other protection elements 162 to 168 and 261 to 268 are provided at portions where the corresponding gate lines 172 to 178 and 271 to 278 and the low-potential sides of the switching elements 152 to 158 and 251 to 258 are connected.

In the present embodiment, the protection elements 161 to 168 and 216 to 268 are connected in series such that two each of the Zener diodes are in opposite directions. A Zener voltage Vz of the protection elements 161 to 168 and 216 to 218 is set to be larger than a gate signal voltage Vs from the pre-drivers 146 and 246 and smaller than a surge withstand voltage Vr of the switching elements 151 to 158 and 251 to 258, that is, Vs<Vz<Vr. When a voltage higher than the surge withstand voltage Vr is applied from the pre-drivers 146 and 246, current flows to the protection elements 161 to 168 and 261 to 268. Accordingly, the switching elements 151 to 158 and 251 to 258 can be protected.

When the first system L1 and the second system L2 are equally used, the first system L1 and the second system L2 may fail at the same time. Accordingly, in the present embodiment, the noise resistance against electrical noise is differentiated between the first system L1 and the second system L2 to decrease the probability of occurrence of simultaneous failure due to the electrical noise.

The first control unit 130 is regarded as a master control unit and the second control unit 230 is regarded as a slave control unit. In this case, by setting the first system L1 including the first control unit 130 as a master system and setting the second system L2 including the second control unit 230 as a slave system, the noise resistance of the first system L1 is made higher than the noise resistance of the second system L2 to protect the master system on a priority basis.

Specifically, a Zener voltage Vz1 of the protection elements 161 to 168 in the first system L1 is set to be larger than a Zener voltage Vz2 of the protection elements 261 to 268 in the second system L2 in a range to be larger than the gate signal voltage Vs and smaller than the surge withstand voltage Vr, that is, Vz1>Vz2. In the present embodiment, the Zener voltage Vz1 is set to be 1.1 times larger than the Zener voltage Vz2. Accordingly, when the tolerance of the protection elements 161 to 168 and 261 to 268 is 5%, for example, the relationship Vz1>Vz2 can hold. This makes the surge resistance of the first system L1 higher than that of the second system L2.

In the present embodiment, the resistor 179 is provided for the gate lines 171 to 178 in the first system L1, whereas no resistor is provided for the gate lines 271 to 278 in the second system L2. This makes it possible to reduce noise in the gate signals in the first inverter circuit 150 and make the surge resistance of the first system L1 higher than that of the second system L2.

As described above, the ECU 10 controls the energization of the motor 80 having the motor windings 180 and 280 as a plurality of winding sets, and includes the energization control circuits, the pre-drivers 146 and 246 as driver circuits, and the protection elements 161 to 168 and 261 to 268. In the present embodiment, the inverter circuits 150 and 250 and the power source circuits 159 and 259 correspond to "energization control circuits".

The inverter circuits 150 and 250 and the power source circuits 159 and 259 are provided for the motor windings 180 and 280 and have the switching elements 151 to 158 and 251 to 258 related to switching the energization to the motor windings 180 and 280. Specifically, the first inverter circuit 150 and the first power source circuit 159 are provided so as to correspond to the first motor winding 180, and the second inverter circuit 250 and the second power source circuit 259 are provided so as to correspond to the second motor winding 280.

The pre-drivers 146 and 246 output gate signals as drive signals to the switching elements 151 to 158 and 251 to 258 through the gate lines 171 to 178 and 271 to 278 as signal lines connected to the switching elements 151 to 158 and 251 to 258. The protection elements 161 to 168 and 261 to 268 are connected to the gate lines 171 to 178 and 271 to 278 and in parallel with the switching elements 151 to 158 and 251 to 258.

Combinations of the motor windings 180 and 280 and electronic components including the inverter circuits 150 and 250 and the power source circuits 159 and 259 provided corresponding to the respective motor windings 180 and 280 are regarded as systems. In at least one of the systems, performance of the protection elements 161 to 168 and 261 to 268 is differentiated from that in the other system to make noise resistance different from that in the other system.

This decreases the probability of occurrence of simultaneous failure of all the systems due to noise. When failure can be avoided in at least one of the systems, the system not in failure can be used to continue the driving of the motor 80.

Specifically, the protection elements 161 to 168 and 261 to 268 are two each Zener diodes connected in opposite directions, and in at least one of the systems, the Zener voltage of the Zener diodes is different from that in the other system. In the present embodiment, the Zener voltage Vz1 of the protection elements 161 to 168 in the first system L1 as the master system is higher than the Zener voltage Vz2 of the protection elements 261 to 268 in the second system L2 as the slave system. Accordingly, the noise resistance of the system with high Zener voltage can be made higher than that of the system with low Zener voltage.

In the present embodiment, in at least one of the systems, performance of the noise smoothing components in the transmission path of the gate signal is differentiated to make the noise resistance different from that in the other system. This decreases the probability of occurrence of simultaneous failure of all the systems due to noise. When failure can be avoided in at least one of the systems, the system not in failure can be used to continue the driving of the motor 80.

Specifically, in one of the systems, the resistor 179 is provided as a noise smoothing component in the gate lines 171 to 178 to differentiate the noise resistance from that in the other system. That is, the resistor 179 is provided to the gate lines 171 to 178 in the first system L1, whereas no resistor is provided to the gate lines 271 to 278 in the second system L2. Therefore, the resistance value of the gate lines 171 to 178 in the first system L1 is larger than the resistance value of the gate lines 271 to 278 in the second system L2. Accordingly, the noise input into the energization control circuit in the first system L1 can be smaller than that in the second system L2, and thus the noise resistance in the first system L1 can be made higher than that in the second system L2.

The ECU 10 includes the first control unit 130 as the master control unit and the second control unit 230 as the slave control unit. The first control unit 130 generates command values related to all the systems and outputs control signals for controlling on/off operations of the switching elements 151 to 158 in its own system to the pre-driver 146 in its own system. Based on the command values transmitted from the first control unit 130, the second control unit 230 generates control signals for controlling on/off operations of the switching elements 251 to 258 in its own system and outputs the same to the pre-driver 246 in its own system. In the present embodiment, the first control unit 130 generates the dq-axis current command values Id1* and Iq1* as command values related to all the systems and transmits the same to the second control unit 230.

With the first system L1 including the first control unit 130 as the master system and the second system L2 including the second control unit 230 as the slave system, the noise resistance of the master system is higher than the noise resistance of the slave system. In the event of a failure in the master system, there is a need to perform a process of transferring a master privilege to the slave side, which may result in time loss due to an abnormality determination calculation, the verification of the calculation, or defects due to wrong determination. Accordingly, in the present embodiment, the master system is protected on a priority basis. Even if the slave system fails, the operations of the master system can be continued unless the mater system fails. This makes it possible to continue the control by the master system without transferring the operations, thereby ensuring high reliability without time loss due to abnormal determination calculation, verification of the abnormality, or defects due to wrong determination.

The first control unit 130 transmits the dq-axis current command values Id1* and Iq1* as command values to the second control unit 230. Accordingly, the master system and the slave system are controlled in current by the same current command values, thereby achieving balanced heat generation. This makes it possible to effectively ensure decrease in the probability of occurrence of simultaneous failure by differentiating the noise resistance from that in the other system. Instead of the dq-axis current command values Id1* and Iq1*, the first control unit 130 may transmit the torque command value Trq1* as the command value to the second control unit 230. Even in this case, the same advantageous effects can be provided.

The first control unit 130 transmits the dq-axis current detection values Id1 and Iq1 to the second control unit 230. The second control unit 230 transmits the dq-axis current detection values Id2 and Iq2 to the first control unit 130. The control units 130 and 230 calculates the respective voltage command values Vd1*, Vq1*, Vd2*, and Vq2* by the sum and difference control in which the sum of currents in the systems L1 and L2 and the difference in current between the currents in the systems L1 and L2 are controlled. Controlling the sum of currents allows the motor 80 to output torque according to the command. Controlling the difference in current makes it possible to control the difference in current between the systems in an appropriate manner.

In particular, setting the current difference command value to 0 eliminates the difference in current between the systems, thereby achieving uniform heat generation in the systems. This makes it possible to further effectively ensure decrease in the probability of occurrence of simultaneous failure by differentiating the noise resistance from that in the other system.

Second Embodiment

Figure 10:
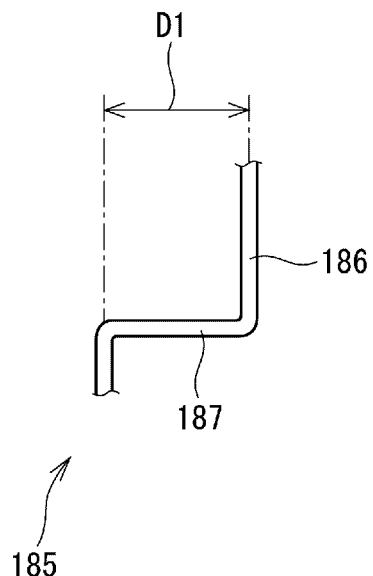
FIG. 10 is a schematic diagram illustrating a lead line in a first system according to the second embodiment.
Figure 11:
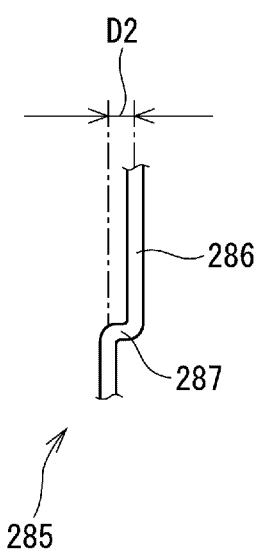
FIG. 11 is a schematic diagram illustrating a lead line in a second system according to the second embodiment.

FIGS. 8 to 12 illustrate a second embodiment. In the present embodiment, the lead lines 185 and 285 for connecting the motor windings 180 and 280 and the substrate 470 are different from those in the first embodiment, which will be mainly described below. As illustrated in FIGS. 8 to 11, the lead lines 185 and 285 are approximately parallel to an axis line Ax and have drawn portions 186 and 186 pulled out from a case 834 to an ECU 10 and routed portions 187 and 287 that are provided along axial ends of winding parts of the motor windings 180 and 280 wound on a stator 840. As illustrated in FIGS. 10 and 11, a length D1 of the routed portion 187 of the lead line 185 is larger than a length D2 of the routed portion 287 of the lead line 285. The routed portion 287 may be omitted depending on the arrangement of the lead line insertion holes 839 or the like.

Figure 12:
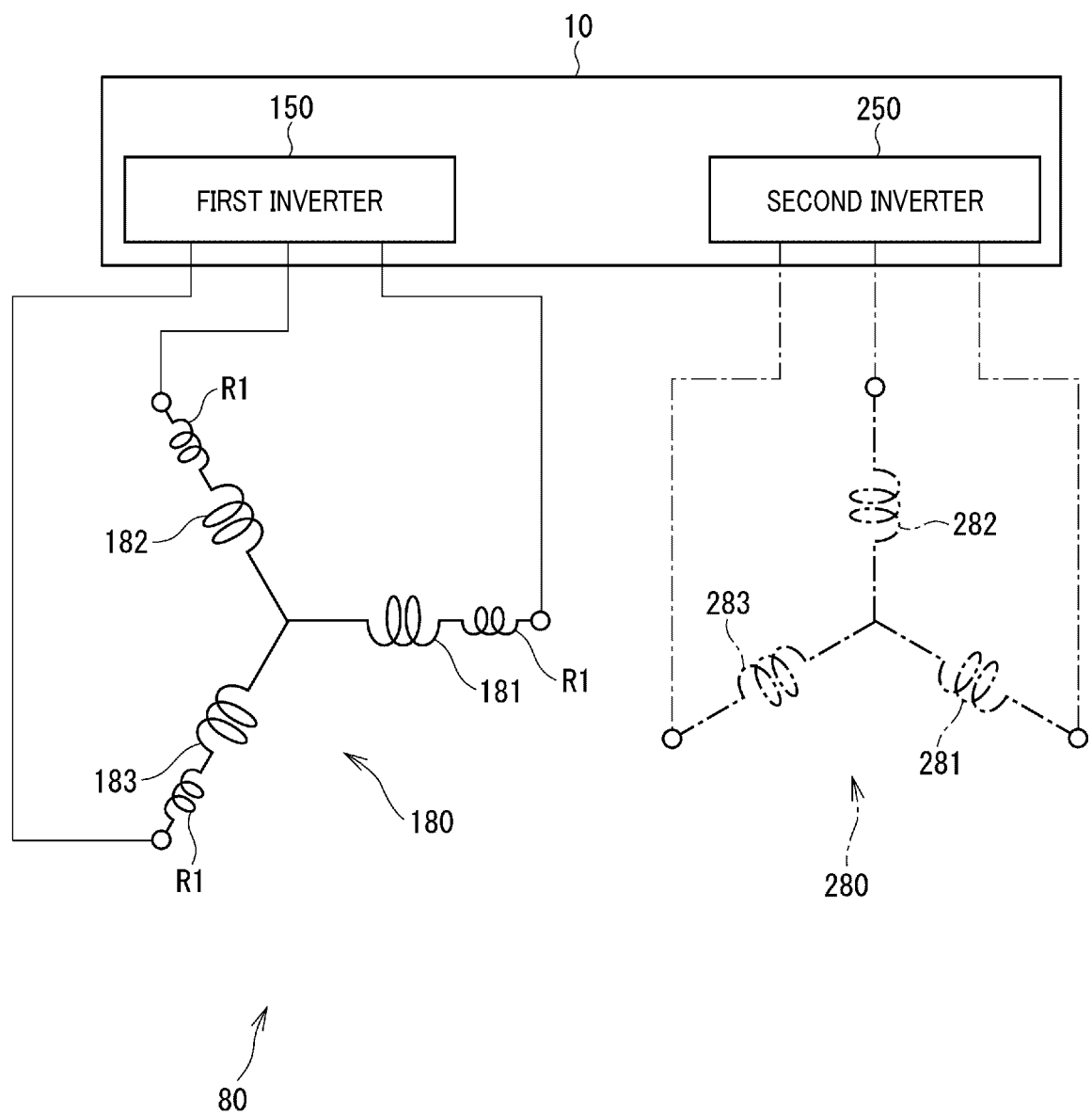
FIG. 12 is a diagram for describing line resistance at routed portions different in length according to the second embodiment.

The difference in resistance between the routed portions 187 and 287 due to different line lengths is virtually designated as line resistor R1. As illustrated in FIG. 12, the first motor winding 180 can be assumed as being in a state in which the line resistor R1 is connected to the coils 181 to 183, and the inductance of the first system L1 is higher than that of the second system L2.

Accordingly, when a counter electromotive voltage is caused by externally driving the motor 80 due to a collision with a curb, for example, the voltage applied to the first inverter circuit 150 becomes lower than the voltage applied to the second inverter circuit 250. This makes the resistance of the first system L1 against the counter electromotive voltage higher than that of the second system L2.

In the present embodiment, in at least one of the systems, noise resistance is differentiated from the other system by differentiating between the lengths of the lead lines 185 and 285 used for connection between the substrate 470 on which the switching elements 151 to 158 and 251 to 258 are mounted and the motor windings 180 and 280. In the present embodiment, the lengths of the lead lines 185 and 285 are differentiated by differentiating the lengths of the routed portions 187 and 287. The system with the longer lead line has larger line resistance and thus becomes higher in noise resistance than the system with the shorter lead line.

This makes it possible to decrease the probability of occurrence of simultaneous failure of all the systems due to noise. When at least one of the systems can avoid failure, the driving of the motor 80 can be continued using the system not in failure. The "noise" includes not only surge components superimposed on various electrical signals but also a counter electromotive voltage caused by externally driving the motor 80. Not only a state in which the switching elements 151 to 158 and 251 to 258 are mounted on the surface of the substrate 470 but also a state in which the switching elements 151 to 158 and 251 to 258 and the substrate 470 are electrically connected together may be regarded as a state in which "the switching elements are mounted on the substrate". Even in this case, the same advantageous effects as those of the foregoing embodiments can be provided.

Third Embodiment

Figure 13:
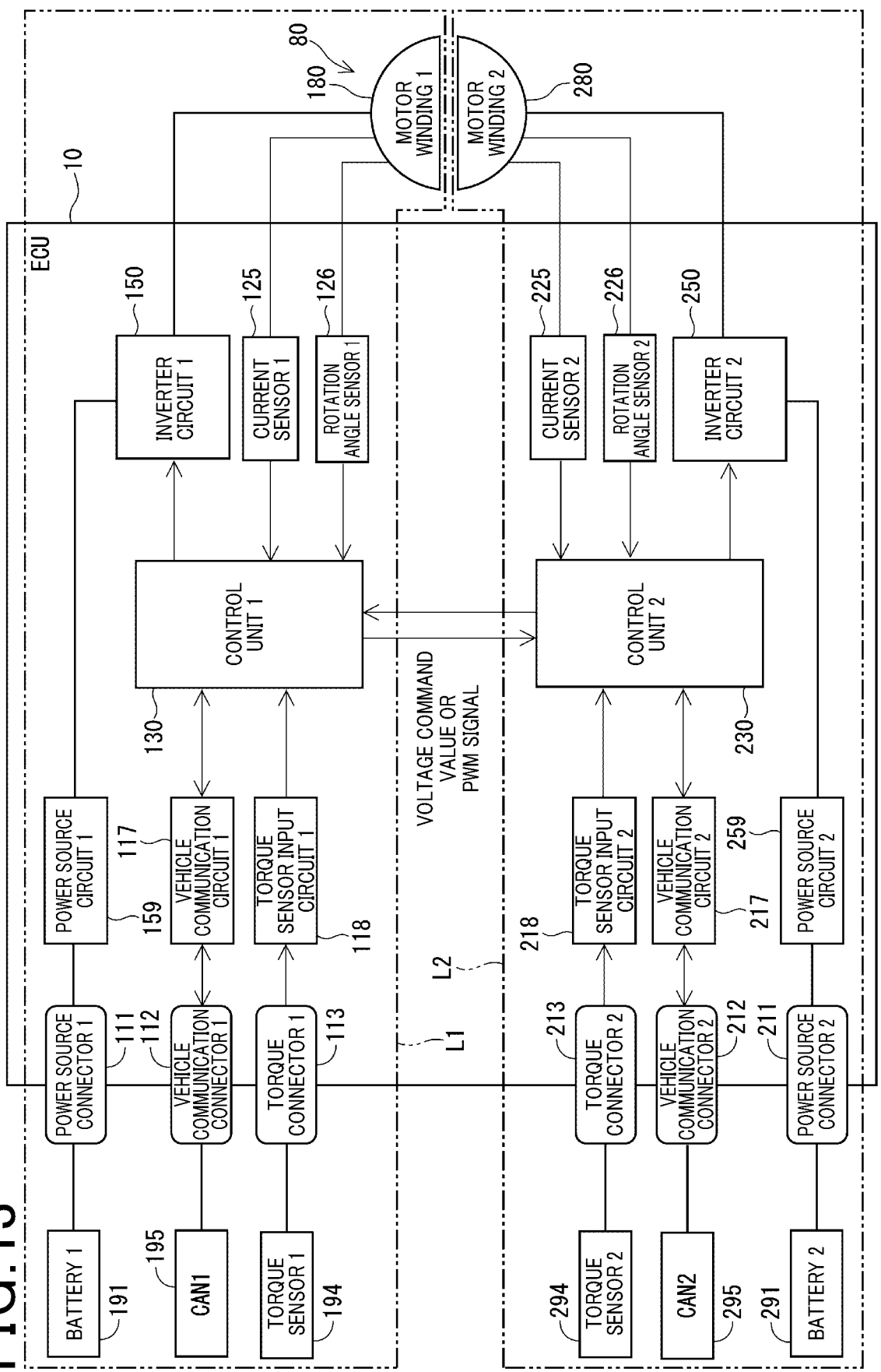
FIG. 13 is a block diagram illustrating an ECU according to a third embodiment.

FIG. 13 illustrates a third embodiment. In the present embodiment, command values transmitted from the first control unit 130 to the second control unit 230 are different from those in the first embodiment, which will be mainly described. The lead lines 185 and 285 may be configured as in the second embodiment. In the first embodiment, the first control unit 130 transmits the current command values or the torque command value as a command value to the second control unit 230. In the present embodiment, the first control unit 130 calculates not only dq-axis voltage command values Vd1* and Vq1* of the first system L1 but also dq-axis voltage command values Vd2* and Vq2* of the second system L2. As command values, the first control unit 130 transmits the dq-axis voltage command values Vd2* and Vq2* to the second control unit 230.

The first control unit 130 may calculate not only PWM signals PWM_u1*, PWM_v1*, and PWM_w1* of the first system L1 but also PWM signals PWM_u2*, PWM_v2*, and PWM_w2* of the second system L2, and may transmit the PWM signals PWM_u2*, PWM_v2*, and PWM_w2* as command values to the second control unit 230. FIG. 13 illustrates command values as information transmitted and received through inter-microcomputer communication but does not illustrate information such as current detection values and others transmitted and received through inter-microcomputer communication.

In the present embodiment, the first control unit 130 calculates voltage command values Vd1* and Vq1* related to the first system L1 and voltage command values Vd2* and Vq2* related to the second system L2, and transmits the voltage command values Vd2* and Vq2* as command values to the second control unit 230. In this case, the voltage command values Vd1* and Vq1* correspond to "master voltage command values", and the voltage command values Vd2* and Vq2* correspond to "slave voltage command values".

The first control unit 130 also calculates PWM signals PWM_u1*, PWM_v1*, and PWM_w1* as control signals related to the first system L1 and calculates PWM signals PWM_u2*, PWM_v2*, and PWM_w2* as control signals related to the second system L2, and transmits the PWM signals PWM_u2*, PWM_v2*, and PWM_w2* as command values to the second control unit 230. In this case, the PWM signals PWM_u2*, PWM_v2*, and PWM_w2* correspond to "slave control signals". Even in this configuration, the same advantageous effects as those of the foregoing embodiments can be provided.

Other Embodiments

In the foregoing embodiments, the protection elements are two each Zener diodes connected in opposite directions. In another embodiment, the protection elements may be resistors, capacitors, or floating resistors or floating capacities in a line system. In the foregoing embodiments, the protection elements are provided in all the systems. In another embodiment, no protection elements may be provided in one of the systems (for example, the slave system) as far as the switching elements have sufficient strength. In this case, since the performance of a protection element in the system without a protection element is regarded as 0, eliminating the protection element in one of the systems is included in the concept of "differentiating the performance of the protection element in at least one of the systems from that in the other system".

In the foregoing embodiments, the energization control circuits include the inverter circuits and the power source circuits. In another embodiment, in addition to the inverter circuits and the power source circuits, motor relay circuits may be provided between the inverter circuits and the winding sets as energization control circuits, and the performance of the protection elements provided so as to correspond to the switching elements constituting the motor relay circuits may be differentiated between the systems. In still another embodiment, the performance of the protection element provided so as to correspond to the switching element constituting at least one energization control circuit may be different between the systems. For example, the performance of the protection element corresponding to the switching element constituting the inverter circuit may be different between the systems, and the performance of the protection element corresponding to the switching element constituting the power source circuit may be equal between all the systems.

In the foregoing embodiments, resistors are provided for the gate lines in the first system, whereas no resistor is provided for the gate lines in the second system. In another embodiment, resistors may be provided for the gate lines in all the systems so that the resistance of the gate lines can be differentiated from that in the other system by differentiating the resistance values of the provided resistors. In addition, noise suppressing circuits other than resistors as noise smoothing components may be provided to differentiate the resistance of the gate lines. Further, the noise smoothing components may be provided in the internal circuits of the pre-drivers.

In the present embodiments, the performance of the protection elements is different between the first system and the second system, and the resistance of the gate lines is different between the first system and the second system. In another embodiment, the performance of the noise smoothing components may be the same between the systems as far as the noise resistance is made different by differentiating the performance of the protection elements. In addition, the performance of the protection elements may be the same between the systems or the protection elements may not be provided in any of the systems as far as the noise resistance is made different by differentiating the performance of the noise smoothing components. Similarly, the performance of the protection elements and the performance of the noise smoothing components may be equal between the systems as far as the length of the lead line is different between the systems.

In the foregoing embodiments, when the current command values or the voltage command values are transmitted as command values from the first control unit to the second control unit, the dq-axis values are transmitted. In another embodiment, the command values are not limited to dq-axis values but may be three-phase current command values or three-phase voltage command values, for example.

In the foregoing embodiments, the first system is the master system and the second system is the slave system. In another embodiment, instead of setting one system as a master system and another system as a slave system, all the systems may perform control equally. In the foregoing embodiments, the number of the systems is two. In another embodiment, the number of systems may be three or more. In addition, some components of the control units such as a microcomputer and a battery may be shared between the systems.

In the foregoing embodiments, the two winding sets are provided and are cancel-wound with a phase shift of 30°. In another embodiment, there are no limitations on the phase difference between winding sets and a method for winding the winding set on the stator. In the foregoing embodiments, the rotary electric machine is a three-phase brushless motor. In another embodiment, the rotary electrical machine is not limited to a three-phase brushless motor but may be any other motor. In the foregoing embodiments, the rotary electric machine control apparatus is applied to an electrical power steering apparatus. In another embodiment, the rotary electric machine control apparatus may be applied to an apparatus other than an electrical power steering apparatus. The present disclosure is not limited to the foregoing embodiments but can be implemented in various manners without deviating from the spirit of the disclosure.

Hereinafter, aspects of the above-described embodiments will be summarized.

A rotary electric machine control apparatus in a first aspect of the present disclosure controls energization of a rotary electrical machine (80) having a plurality of winding sets (180, 280), and includes an energization control circuit (150, 159, 250, 259), a driver circuit (146, 246), and a protection elements (161 to 168, 261 to 268).

The energization control circuit is provided for each of the winding sets and has a switching element (151 to 158, 251 to 258) related to switching of energization to the winding set. The driver circuit outputs a drive signal to the switching element through a signal line (171 to 178, 271 to 278) connected to the switching element. The protection element is connected to the signal line and in parallel with the switching element. Combinations of the winding sets and electronic components including the energization control circuit provided for each of the winding sets are regarded as systems. In at least one of the systems, performance of the protection element is differentiated from that in the other system to make noise resistance different from that in the other system.

Rotary electric machine control apparatuses in second and third aspects of the present disclosure control energization of a rotary electric machine (80) having a plurality of winding sets (180, 280), and include an energization control circuit (150, 159, 250, 259) and a driver circuit (146, 246).

The energization control circuit is provided for each of the winding sets and has a switching element (151 to 158, 251 to 258) related to switching of energization to the winding set. The driver circuit outputs a drive signal to the switching element through a signal line (171 to 178, 271 to 278) connected to the switching element. Combinations of the winding sets and electronic components including the energization control circuit provided for each of the winding sets are regarded as systems.

In the second aspect, in at least one of the systems, performance of a noise smoothing part (179) in a transmission path of the drive signal is differentiated to make noise resistance different from that in the other system.

In the third aspect, in at least one of the systems, a length of a lead line (185, 285) used for connection between a substrate (470) on which the switching element is mounted and the winding set is differentiated from that in the other system to make noise resistance different from that in the other system.

According to the above, the probability of occurrence of simultaneous failure of all the systems due to noise can be decreased. When at least one system can avoid failure, the system not in failure can be used to continue driving of the rotary electric machine.

What is claimed is:

1. A rotary electric machine control apparatus that controls energization of a rotary electric machine having a plurality of winding sets, comprising:
    an energization control circuit that is provided for each of the winding sets and has a switching element related to switching of energization of each coil of the plurality of winding sets;
    a driver circuit for each winding set that outputs a drive signal to each respective switching element of a respective winding set through a signal line connected to each respective switching element; and
    a protection element that is connected to the signal line of each respective switching element and in parallel with the switching element, wherein
    for a state in which combinations of the plurality of winding sets and electronic components including the energization control circuit provided for each of the winding sets are regarded as systems, in at least one of the systems, performance of protection elements of winding sets of the at least one of the systems are differentiated from those in the other system to make noise resistance different from noise resistance in the other system, and
    the rotary electric machine control apparatus further comprising:
    a master control unit that generates a command value related to all the systems and outputs a control signal for controlling on/off operations of the switching element in an own system to the driver circuit in the own system; and at least one slave control unit that, based on the command value transmitted from the master control unit, generates a control signal for controlling on/off operations of the switching element in an own system and outputs the same to the driver circuit in the own system, wherein for a state in which a system including the master control unit is regarded as a master system and a system including the at least one slave control unit is regarded as a slave system, noise resistance of the master system is higher than noise resistance of the slave system.

2. The rotary electric machine control apparatus according to claim 1, wherein the protection element is two Zener diodes that are connected in series in opposite directions, and in at least one of the systems, a Zener voltage of the Zener diode as the protection element is different from a Zener voltage in the other system.

3. The rotary electric machine control apparatus according to claim 1, wherein the master control unit transmits a current command value as the command value to the at least one slave control unit.

4. The rotary electric machine control apparatus according to claim 3, wherein the master control unit transmits a current detection value of the master system to the at least one slave control unit, the at least one slave control unit transmits a current detection value of the slave system to the master control unit, and the master control unit and the at least one slave control unit calculate voltage command values by control of sum and difference in which a sum of current in the master system and the slave system and a difference in current between the master system and the slave system are controlled.

5. The rotary electric machine control apparatus according to claim 1, wherein the master control unit transmits a torque command value as the command value to the at least one slave control unit.

6. The rotary electric machine control apparatus according to claim 1, wherein the master control unit calculates a voltage command value related to the master system and a slave voltage command value as a voltage command value related to the slave system, and transmits the slave voltage command value as the command value to the at least one slave control unit.

7. The rotary electric machine control apparatus according to claim 1, wherein the master control unit calculates the control signal related to the master system and a slave control signal as the control signal related to the slave system, and transmits the slave control signal as the command value to the at least one slave control unit.

* * * * *